United States Patent [19]

Schneider, Jr.

[11] 3,842,672

[45] Oct. 22, 1974

[54] FLOW PROFILER FOR HIGH PRESSURE ROTARY METERS

[75] Inventor: George W. Schneider, Jr., Huntingdon Valley, Pa.

[73] Assignee: The Singer Company, New York, N.Y.

[22] Filed: May 9, 1973

[21] Appl. No.: 358,784

[52] U.S. Cl. ................ 73/253, 73/261, 73/272 R
[51] Int. Cl. ............................................. G01f 3/08
[58] Field of Search ....... 73/253, 257, 261; 418/170

[56] References Cited
UNITED STATES PATENTS

| | | | |
|---|---|---|---|
| 3,482,446 | 12/1969 | Wrinkle et al. | 73/257 |
| 3,554,032 | 1/1971 | Schneider, Jr. | 73/257 |

Primary Examiner—Herbert Goldstein
Attorney, Agent, or Firm—Marshall J. Breen; Chester A. Williams, Jr.; Harold Weinstein

[57] ABSTRACT

A rotary meter of the vane type having a rotary gate separating the inlet from the outlet. The rotor vanes and the gate are rotated in a predetermined timed sequence by a suitable transmission such as a timing gear which interconnects the rotor and the gate. A profiler means is connected in the inlet to direct the fluid flow to impinge tangentially upon the gate to increase the rotational speed thereof so as to compensate for any fluid leakage through the meter. Since the rotor and the gate rotate in the same direction, any increase in the rotational speed of the gate will be transmitted to the rotor through the timing gear so as to also increase the rotational speed of the rotor vanes.

12 Claims, 7 Drawing Figures

PATENTED OCT 22 1974 3,842,672

FLOW PROFILER FOR HIGH PRESSURE ROTARY METERS

BACKGROUND OF THE INVENTION

Common to all fluid measuring meters of the rotary type is a small percentage of leakage through the meter due to the necessary clearances between the rotating and stationary elements of the meter. This leakage results in a "slow" meter, i.e., less gas is registered than actually flows through the meter. Furthermore, the amount of leakage is a function of the meter pressure differential which exists between the inlet and outlet pressure, and also has a tendency to increase as the fluid pressure increases. The result is a decrease in metering accuracy that for a operating pressure of 1,000 psi can amount to as much as a 2½ percent loss. For most applications the maximum permissible variation in metering accruacy is plus or minus 1 percent. Therefore, unless such accruacy can be obtained, the rotary vane type meter would not be acceptable for high pressure application.

SUMMARY OF THE INVENTION

It is an object of the present invention to provide an improved high pressure rotary meter having a flow profiler which overcomes the prior art disadvantages; which is simple, economical and reliable; which improves the accruacy of the meter to within plus or minus 1 percent; which permits rotary vane type high pressure applications; which profiler is connected in the inlet of the meter to direct the flow to impinge tangentially upon the rotating gate to increase the rotational speed thereof so as to compensate for any fluid leakage through the meter; which reduces the cross sectional area of the inlet from between 10 percent to 80 percent; which is used in a meter having the rotor and gate rotate in the same direction; and which compensates for "slowing" of the meter by increasing the rotational speed of the rotor vanes as a result of increasing the rotational speed of the gate.

Other objects and advantages will be apparent from the following description of one embodiment of the invention and the novel features will particularly pointed out hereinafter in the claims.

BRIEF DESCRIPTION OF THE DRAWINGS

This invention is illustrated in the accompanying drawings in which.

DESCRIPTION OF THE INVENTION

Figures 1, 2, 3, 4, 5, 6, 7:
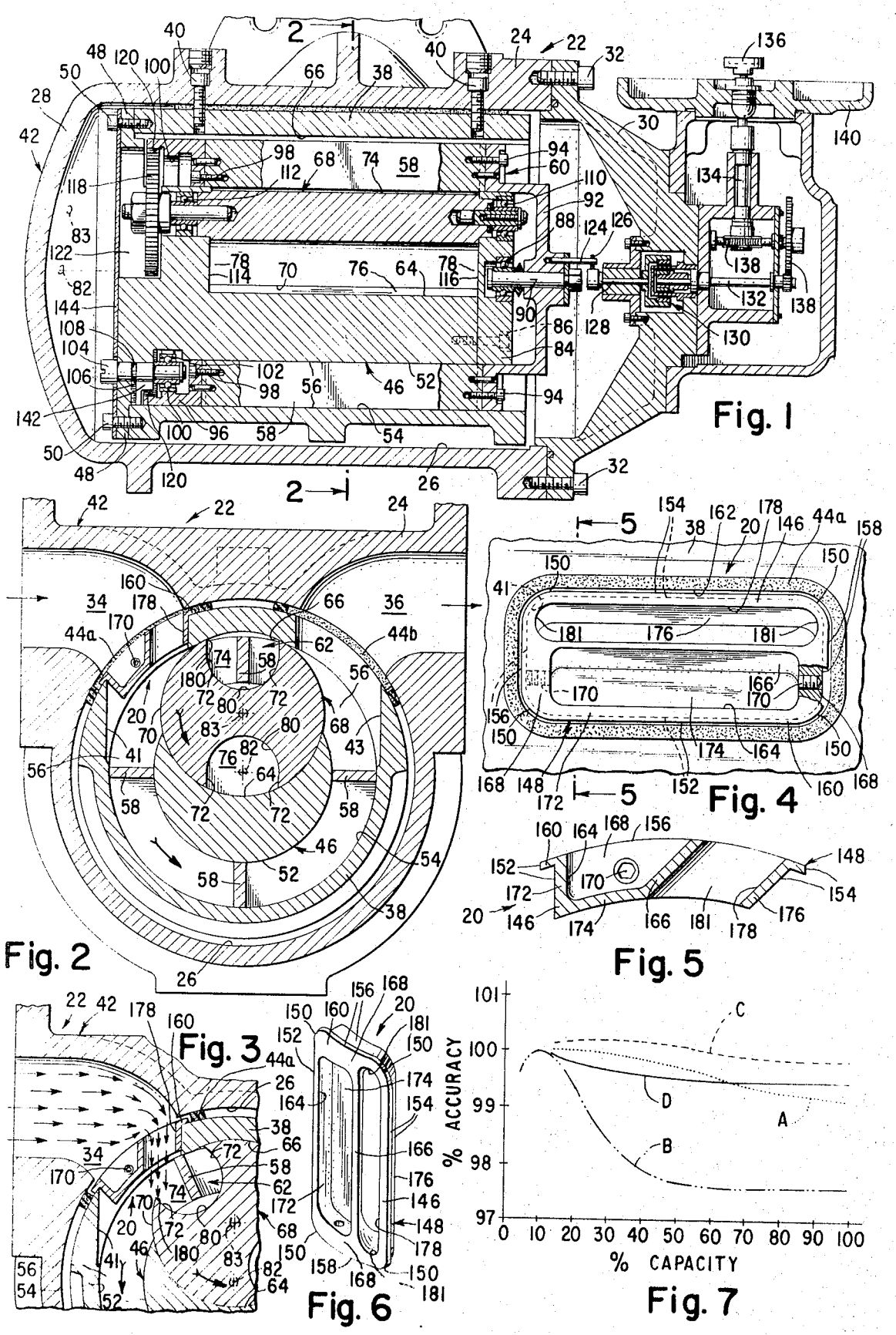
FIG. 1 is a sectional side elevational view of a meter embodying the present invention.
FIG. 2 is a sectional front elevational view taken substantially along line 2—2 of FIG. 1.
FIG. 3 is a fragmentary front elevational view of the inlet area of the meter showing the profiler, and diagrammatically representing the direction of fluid flow.
FIG. 4 is a top plan view of the profiler seen from the inlet side looking into the meter.
FIG. 5 is a side elevational view taken substantially along line 5—5 of FIG. 4.
FIG. 6 is a perspective view of the profiler of the present invention.
FIG. 7 is a diagrammatic representation of the charting of the percent accruacy versus the percent capacity for meters at different pressures, both with and without the profiler of present invention.

In the embodiment of the invention illustrated in FIGS. 2 through 6, the novel flow profiler designated generally 20, is shown embodied in a positive displacement rotary meter 22 shown in FIGS. 1, 2 and 3. The meter 22 can assume any fluid, but for the present instance gas measurement is assumed. The meter 22 is briefly described herein, but for a more detailed description thereof, reference may be had to U.S. Pat. No. 3,554,032, granted Jan. 12, 1971, and entitled "Rotary Fluid Meter".

The meter 22, as shown in FIG. 1, has a stationary housing 24 with a central opening 26. This opening 26 is closed at one end by the integral end member 28, and is closed at the other end by the bonnet 30 attached to the housing 24 by fastenings 32. The housing 24 has an inlet passage 34 and an outlet passage 36 illustrated in FIG. 2. A stationary liner 38 is positioned within the bore 26 and is fixed to the housing 24 by means of the fasteners 40. The housing 24 and the liner 38 are part of the stationary body 42. The liner 38 has an inlet opening or port 41 aligned with the inlet passage 34, and an outlet opening or port 43, aligned with the outlet passage 36, as depicted in FIG. 2. Separate gaskets 44a and 44b are clamped between the housing 24 and the liner 38, in the region of the inlet port 41 and outlet port 43, respectively. The flow profiler 20 is mounted in the inlet port 41 as shown in FIGS. 2 and 3 for purposes more fully explained hereinafter.

A stationary crescent-shaped member 46 is provided with an end flange 48, fixed to the liner 38 by fastenings 50. The member 46 has an outer wall surface 52 shown in FIG. 1 which is concentric with the liner wall surface 54 in the liner 38, and these walls define an arcuate channel or passage 56 between them. The arcuate channel 56 receives the vanes or blades 58 of a rotor 60 which is mounted to rotate within the liner 38. An offset cavity 62 within the liner 38 is defined by the concave cylindrical surfaces 64 and 66, and this cavity 62 intercepts the arcuate channel 56. A rotary gate 68 is mounted to turn in the offset cavity 62 and its outer cylindrical surface 70 fits closely within the surfaces 64 and 66. The surface 70 is interrupted to provide entrance openings 72 into separate open spaces or pockets 74 and 76, formed within the rotary gate 68 as illustrated in FIGS. 1 and 2. The end walls 78 of the rotary gate 68 are cut away, as shown at 80, to provide clearance for the rotor blades 58. The axis of rotation 82 of the rotor 60 intercepts the offset cavity 62 and the path of movement of the rotary gate 68 because the diameter of the rotary gate is greater than one-half the diameter of the rotor 60. The rotary gate 68 has an axis of rotation 83 parallel to axis 82 and spaced above the same. The rotary gate 68 serves as a rotary valve to permit passage of the vanes 58, but at the same time prevents leakage of the gas between the inlet 34 and the outlet 36.

For convenience in assembly, the member 46 includes a stationary plate 84 fixed thereto by fastenings 86. A front bearing assembly 88 is mounted in the plate 84 and supports a trunnion 90 fixed on the end flange 92 of the rotor 60. The rotor blades 58 are secured to this end flange 92 by means of threaded fastenings 94, and depicted in FIG. 1.

An end ring 96 illustrated in FIG. 1 is secured to the other end of the rotor blades 58 by means of fastenings 98, and the end ring 96 is provided with a circular trackway 100. The trackway 100 is contacted by a plurality of circumferentially spaced rollers 102 each mounted on a support or trunnion 104 carried on the member 46 as illustrated in FIG. 1. A set screw 106 engages a groove 108 in each support pin 104 to prevent axial movement of the support pin 104. Accordingly, one end of the rotor 60 is supported by means of the trunnion 90 and bearing 88, and the other end is supported by means of the rollers 102 and the trackway 100.

The rotary gate 68 is supported on axially spaced bearings 110 and 112. The bearing 110 is carried on the plate 84 and the bearing 112 is carried on the crescent-shaped member 46. The parallel end walls 78 on the rotary gate 68 have running clearance with a stationary wall 114 and surface 116 of the plate 84, respectively. An external spur gear 118 is fixed to the rotary gate 68 and meshes with the internal spur gear 120 provided on the ring 96 of the rotor 60. The gear 118 is mounted within a clearance pocket 122 provided on the member 46. The fixed diameter of the gear 118 is one-half that of the internal gear 120, so that the rotary gate 68 turns at twice the speed of the rotor 60. Thus, the two pockets 74 and 76 in the rotary gate 68 are adequate for successive reception of the four rotor blades 58. The gears 118 and 120 serve as timing gears to control the relative position of the rotor 60 and the gate 68 so as to permit the vanes 58 to pass within the pockets 74 and 76 upon rotation of the rotor 60 and gate 68.

A mechanism for driving a counter or other readout register device is conveniently mounted in the bonnet 30. In the register depicted in FIG. 1, an axially projecting offset pin 124 on the rotor flange 92 engages a radial arm 126 fixed to a shaft 128. A magnetic coupling device 130 connects the shaft 128 to a shaft 132. The shaft 132 drives a shaft 134 and a coupling 136 through a speed reducing gear train 138. A suitable counter mechanism (not shown) is mounted on the bonnet flange 140 and arranged to be driven by the coupling 136.

The trackway 100 and the internal gear 120 form a portion of the outer boundary of an annular space 142 into which the trunnions 104 and the gear 118 project. The only openings through which fluid can flow into the annular space 142 are the long labyrinth seals formed by the runnings clearances between the rotating and stationary parts, since the back opening thereof is closed by means of a cover plate 144. Dirt particles in the fluid stream are thus excluded from the bearings, gears and trackway.

In the absence of the flow profiler 20 the meter 22 would operate as it did in the prior art. The housing flanges at the inlet 34 and the outlet 36 of the meter 22 are connected to suitable piping (not shown). Fluid under pressure is admitted through the inlet passage 34 and opening 41, and into the annular channel 56. fluid pressure acting on the upstream side of the rotor vane 58 shown at the 9 o'clock position in FIG. 2, causes the rotor 60 to turn within the liner 38 in a counter-clockwise direction. The gearing 118, 120 turns the rotary gate 68 in a counter-clockwise direction at twice the speed. The rotary gate 68 prevents direct flow from the inlet 34 to the outlet 36 and requires the fluid to flow through the annular channel 56. Each of the rotor blades 58 is received in one of the gate pockets 74 or 76 as it passes from a position near the outlet 36 to a position near the inlet 34. Rotation of the rotor 60 is transmitted through the pin 124 and the shaft 126, magnetic coupling 130, and through the gear train 138 to drive the coupling 136. The fluid exits the channel 56 through the port 43 and outlet passage 36 as shown in FIG. 2.

The accruacy of the meter 22 during low pressure operation is acceptable and expected to be within the range of plus or minus 1 percent, both with and without the flow profiler 20. Since the leakage through the meter 22 will increase as the gas pressure increases less gas will be registered than is actually flowing through the meter 22 unless some compensation for such leakage is made. Also, the leakage is not a constant percentage of the total gas flow as the gas pressure increases, but tends to increase slightly resulting in a meter which runs "slower" as the operating pressure increases further. It is the principal purpose of the flow profiler 20 of the present invention to compensate for such leakage so as to permit positive displacement rotary meters, such as meter 22 to be used in high pressure application.

The flow profiler 20 shown in FIGS. 4, 5 and 6 includes a one piece body portion 146 having a generally rectangular shaped periphery 148 with rounded corners 150. The periphery 148 has two long sides 152 and 154, and two short sides 156 and 158. An annular lip or flange is formed about the periphery 148. The lip 160 is sized to overlap the port 41 as illustrated in FIGS. 2 and 3 so that the profiler can securely nest therein. The lip 160 terminates short of the gasket 44a so as to form an annular space 162 therebetween. A longitudinal recess 164 is formed adjacent the side 152, and a short distance inwardly of sides 156 and 158 to terminate in a longitudinally extending partition wall 166. Walls 168 are formed between the recess 164 and the side walls 156 and 158 to extend between the partition 166 and the side 152. Each of the walls 168 is tapped to receive a set screw 170 which is turned to engage the walls of port 41 to secure the profiler 20 therein. Adjacent the side 152 an end wall 172 is formed to bound the recess 164 between opposite walls 168. A bottom wall 174 is connected between the four side walls 166, 168, 168, and 172. The top end of the recess is open. The walls 168, 168 and 172 define right angles with the bottom wall 174, while the angle formed between the bottom 174 and the partition wall 166 is greater than 90°. An end wall 176 is formed adjacent the side 154 to extend in parallel relationship to the partition wall 166 in spaced relationship thereto. A longitudinally extending aperture 178 having openings at the top and bottom thereof is formed between the walls 166 and 176 with ends 181 curved to enclose the aperture 178. The ends 181 extend between the walls 176 and 166 to join into the walls 168. The wall of the liner 38 at the port 41 as depicted in FIGS. 2 and 3 is substantially vertical. Upon mounting the profiler 20 within the port 41 the end wall 176 is placed in proximity to the vertical wall of the port 41 while the opposite end wall 172 stands in angular relationship to the adjacent port 41 wall. In its connected posture the profiler 20 has its aperture 178 define a vertically, downwardly extending opening with the walls 166 and 176 disposed substantially vertical and in parallel relationship to the wall of the port 41. The inlet 34 and its connected port 41 are of substantially the same size as the outlet 36 and its connected port 43. The cross-sectional area of the aperture 178 greatly reduces the cross-sectional area of either the inlet 34 and the port 41, substantially within the range of an 80% reduction in cross-sectional area.

The direction of rotation of the rotor 60 and the gate 68 are both counter-clockwise as shown in FIGS. 2 and 3, and in the same path as that of the incoming gas flow from the inlet 34. This characteristic is used to good purpose by the profiler 20 so as to compensate for the decrease in meter accruacy with increasing pressure.

The profiler 20 has its aperture 178 placed in superposition to the tangential edge of the rotating gate 68. Accordingly, the profiler 20 directs the incoming gas stream represented by the plurality of arrows in the inlet 34 of FIG. 3 so that on passing through aperture 178 the stream will be directionally guided to impinge tangentially upon the rotary gate 68. The tangentially directed gas stream passing through aperture 178 impinges on the leading edge 180 of the pockets 74 and 76 respectively to drive the rotary gate 68 in a manner similar to a turbine wheel. This produces an increase in rotational speed of the gate 68 as a result of the energy thus derived from the gas stream. The increase in rotational speed of the gate 68 is transmitted via the timing gears 118 and 120 to the rotor 60 whereby the rotor 60 and its connected vanes 58 will be driven faster. The excess speed imparted to the rotor 60 tends to compensate for the slowing of the meter due to gas leakage through the meter. Furthermore, as the gas pressure increases the density increases which imparts additional energy to the rotating gate 68, thus increasing the compensation factor.

The meter 22 is symetrical in the sense that the fluid flow entering inlet 34 and exiting outlet 36 could be reversed by either turning the meter to place the outlet 36 in the inlet position and the inlet 34 in the outlet position, or by simply connecting the inlet line into outlet 36 whereby the fluid would pass through the meter to then exit from the now inlet 34. In the present instance the fluid such as a gas would enter the inlet 34 pass through profiler 20 through the port 41 into the passage 56 to rotate the rotor 60 and the gate 68 in a clockwise direction whereupon the gas would exit through port 43 into the outlet 36 to be discharged from the meter 22. However, if the outlet 36 served as the inlet the passage through the meter 22 by way of flow channel 56 would cause the rotor 60 and gate 68 to rotate in the clockwise direction, but otherwise the operation would be substantially the same. By constructing the inlet 34 and the oultet 36 identical to each other the reversibility is facilitated. Likewise the ports 41 and 43 are mirror images of each other. Hence the substantially "U" shaped flow pattern through meter 22 lends itselfs to the reversibility of the fluid flow. The general configuration of the inlet 34 and the outlet 36 is substantially identical, as is the ports 41 and 43. To produce the desired results the flow profiler 20 is connected in the inlet side of the meter 22 so as to direct the flow tangentially upon the leading edge 180 of the gate 68. However, were the flow through meter 22 were to be reversed it would be a simple matter of removing the profiler 20 from the now inlet 34 and reconnecting the same into the now outlet 36 so as to place in on the new inlet side of the meter 22. the profiler 20 to be placed in the tangential position for the meter 22 has the aperture 178 disposed on the side closest to the respective axes 82 and 83 toward the center of the meter 22. Likewise if the flow were to be reversed and it was desirable to connect the profiler 20 within the port 43 at the outlet 36 the aperture 178 would be placed toward the center side of the meter 22.

The dramatic results in the improved performance of the meter 22 through the use of the profiler 20 is shown in FIG. 7 wherein the percentage accruacy is charted against the percentage capacity. The dotted line of curve A represents the flow through a rotary meter of the same type as meter 22 wherein the pressure is 100 psi and no flow profiler is used. It is noted that curve A maintains a substantially 100 percent accruacy until reaching around 50 percent of capacity and then drops off to a nearly 1 percent loss in accruacy for the capacity between 80 to 100 percent.

The dash line curve C represents the same type meter as was used in curve A except that the profiler 20 was embodied in the meter with the pressure remaining at 100 psi. In curve C it is seen that the accruacy remains slightly above 100 percent for the first 50 percent of capacity of flow and then is slightly below 100 percent for the remaining 50 percent capacity of flow. Accordingly, even at the low flow pressure of 100 psi the accruacy of the meter 22 is greatly enhanced through the use of a profiler 20 in the inlet side of the meter 22.

The dot-dash line curve B represents a meter of the same type as meter 22 which was not equipped with a flow profiler at an operating pressure of 1,000 psi. At the higher pressure of 1,000 psi it is noted that at substantially 20 percent of the meter capacity the accruacy drops below 99 percent and continues to deteriorate until about 50 percent capacity before leveling off at a loss of about 2½ percent of meter accruacy. The degree of loss below 99 percent would be unacceptable.

The straight line curve D, used the same meter as was used to develop the information in curve B wherein the pressure of the fluid flow was 1,000 psi except that the profiler 20 was used with the meter 22. The curve D accruacy drops slightly below 100 percent to a loss which at not time is greater than 0.5 percent so as to remain well within the range of between 99 percent to 100 percent accruate at all times during the flow through the meter from 0 to 100 percent capacity. This is an outstanding improvement over past performances of meter of this type, and can only be attributed to the use of the novel flow profliler 20.

It will be understood that various in the details, materials, arrangements of parts and operating conditions which have been herein described and illustrated in order to explain the nature of the invention may be made by those skilled in the art within the principles and scope of the invention.

Having thus set forth the nature of the invention, what is claimed herein is:

1. In a rotary meter, the combination of:
   a. a housing having an inlet and outlet therein,
   b. a housing having a chamber means formed therein,
   c. a rotor journaled in the chamber means,
   d. a rotor including a plurality of vanes,
   e. a gate rotatively mounted in the chamber means to prevent fluid from the inlet from directly flowing to the outlet, f. the gate having an open space adapted to receive successive vanes therein, g. a transmission means interconnecting the rotor and the gate to rotate the gate in timed relation with the rotor and in the same direction whereby each vane is moved through the open space of the gate in its path of rotational travel within the chamber means, and h. a profiler means connected in the inlet to increase the velocity of the flow and to concentrate the flow in the area of the gate by directing the flow thereto to produce an increase in the rotational speed thereof.

2. The combination claimed in claim 1 wherein:

a. the inlet has a predetermined cross-sectional area, b. the outlet has a cross-sectional area substantially equal to that of the inlet, and c. the profiler means reducing the cross-sectional area of the inlet, with the range of reduction being between 10 percent to 80 percent.

3. The combination claimed in claim 1 wherein:

a. the open space of the gate defines a pocket, b. the pocket has a leading edge, and c. the profiler means directing the flow toward the leading edge of the pocket to cause an increased incidence of the flow impinging the leading edge to produce an increase in the rotational speed of the gate.

4. The combination claimed in claim 1 wherein:

a. the axis of the rotor and the axis of the gate defining a hypothetical plane, and b. the profiler means directing the flow parallel to the hypothetical plane formed by the rotor and the gate axis whereby a greater portion of the flow will be directed toward the gate.

5. The combination claimed in claim 4 wherein:

a. the inlet and the outlet lying in substantially the same plane, b. the axes of the rotor and the gate lying in a plane substantially perpendicular to the plane of the inlet and the outlet, c. the plane of the inlet and the outlet is disposed above the axes of the rotor and the gate, and d. the profiler means to direct the flow from the inlet parallel to the plane of the axes of the rotor and the gate.

6. The combination claimed in claim 1 wherein:

a. the rotor and the gate rotate in the same direction whereby any increased rotational speed of the gate responsive to the increased concentration of flow caused by the profiler means is, via the transmission means, additive to the rotational speed of the vane.

7. The combination claimed in claim 6 wherein:

a. a stationary member is axially disposed in the chamber means inwardly of the vanes, b. a flow passage is formed in the chamber means between the housing and the stationary member to communicate the inlet with the outlet, and c. the gate is mounted in the flow passage between the inlet, the stationary member and the outlet to block passage of fluid from inlet from flowing directly to the outlet until the fluid has flowed in the flow passage.

8. The combination claimed in claim 7 wherein:

a. the axis of the rotor is centrally disposed in the housing, b. the axis of the gate is disposed parallel to the axis of the rotor and in spaced relationship therewith, and c. the flow passage defining a substantially "U" shaped channel extending from the inlet to the outlet with the central closed portion containing the stationary member and the gate.

9. In a rotary meter operative to rotate in one or the other direction, the combination of:

a. a housing having a pair of spaced passages, b. a stationary member disposed within the housing, c. a flow channel formed between the housing and the stationary member, d. the flow channel in communication with each of the spaced passages, e. a rotor journaled in the housing, f. the rotor having a plurality of vanes disposed to rotate within the flow channel, g. a rotary gate journaled in the housing and disposed in the flow channel to prevent direct flow between the spaced passages and to permit flow from one passage into the flow channel and then to the other of the spaced passages, h. the rotary gate having at least one pocket, i. a transmission means interconnecting the rotor and the gate to rotate each in the same direction in a predetermined timed sequence to permit the vanes to pass successively through the gate within the pocket thereof, and j. a flow profiler mounted in the spaced passage which delivers the flow to the flow channel to increase the velocity of the flow therethrough and to concentrate the flow in the area of the gate to produce an increase in the rotational speed of the gate and the rotor.

10. The combination claimed in claim 9 wherein:

a. each of the spaced passages substantially the same size, b. the rotor and the gate journaled in the housing to be rotated in one or the other direction, and c. the flow profiler mounted in one of the spaced passages which delivers the flow into the flow channel.

11. The combination claimed in claim 10 wherein:

a. the spaced passages delivering the flow into the flow channel defining an inlet, and b. the flow profiler mounted in the inlet.

12. The combination claimed in claim 11 wherein:

a. the direction of rotation of the rotor and the gate in one direction upon one of the spaced passages serving as the inlet, and the said direction of rotation to reverse upon the other of the spaced passages serving as the inlet.

* * * * *